US010983229B2

(12) United States Patent
Davies (10) Patent No.: US 10,983,229 B2
(45) Date of Patent: Apr. 20, 2021

(54) SPECTRAL DATA COMPRESSION (71) Applicant: SOLETANCHE FREYSSINET S.A.S., Rueil-Malmaison (FR)

(72) Inventor: Michael Davies, Newbury (GB)

(73) Assignee: SOLETANCHE FREYSSINET S.A.S., Rueil-Malmaison (FR)

( * ) Notice: Subject to any disclaimer, the term of this patent is extended or adjusted under 35 U.S.C. 154(b) by 1171 days.

(21) Appl. No.: 15/316,292

(22) PCT Filed: Jun. 5, 2015

(86) PCT No.: PCT/GB2015/051640
§ 371 (c)(1),
(2) Date: Dec. 5, 2016

(87) PCT Pub. No.: WO2015/185936
PCT Pub. Date: Dec. 10, 2015

(65) Prior Publication Data
US 2017/0139062 A1 May 18, 2017

(30) Foreign Application Priority Data

Jun. 5, 2014 (GB) ..................................... 1410028

(51) Int. Cl.
*G06F 16/00* (2019.01)
*G01T 7/00* (2006.01)
(Continued)

(52) U.S. Cl.
CPC .................. *G01T 7/00* (2013.01); *G01T 1/36* (2013.01); *G06F 16/1744* (2019.01)

(58) Field of Classification Search
CPC ..... G01T 1/36; G01T 7/00; G01J 3/28; G06T 9/005; H03M 7/30; G06F 16/1744
(Continued)

(56) References Cited

U.S. PATENT DOCUMENTS 5,533,051 A * 7/1996 James ..................... G06T 9/005
341/51
5,838,821 A 11/1998 Matsubara et al.
(Continued)

FOREIGN PATENT DOCUMENTS

| JP | H11-41472 A | 2/1999 |
| JP | 2002-300407 A | 10/2002 |
| WO | 2011/080030 A2 | 7/2011 |

OTHER PUBLICATIONS

Search Report for United Kingdom Patent Application No. GB1410028.3 dated Dec. 2, 2014, 7 pages.
(Continued)

*Primary Examiner* — Vincent F Boccio
(74) *Attorney, Agent, or Firm* — Withrow & Terranova, P.L.L.C.; Vincent K. Gustafson (57) ABSTRACT A data processing system (10) for compressing gamma spectroscopy data includes a data input (18) for receiving data representing counts for each of a plurality of bins. The counts represent a set of binned gamma spectroscopy data. The data processing system (10) also includes a processor (20). The processor (20) is arranged to: read the counts in each bin; calculate a measure representative of the counts using the counts in one or more of the bins; choose, using the measure, which one of at least two compression schemes to use to compress the data representing the counts; and compress the data representing the counts according to the chosen compression scheme; and write the compressed data representing the counts to a data storage device (22).

11 Claims, 5 Drawing Sheets

(51) Int. Cl.
*G01T 1/36* (2006.01)
*G06F 16/174* (2019.01)

(58) Field of Classification Search
USPC .......................................................... 707/693
See application file for complete search history.

(56) References Cited

U.S. PATENT DOCUMENTS

| | | | | |
|---|---|---|---|---|
| 6,584,413 | B1* | 6/2003 | Keenan | G01J 3/28 |
| | | | | 702/194 |
| 2009/0089626 | A1* | 4/2009 | Gotch | H03M 7/30 |
| | | | | 714/45 |
| 2009/0152471 | A1* | 6/2009 | Rousso | A61B 6/037 |
| | | | | 250/363.04 |
| 2014/0104289 | A1 | 4/2014 | Nakayama | |

OTHER PUBLICATIONS

Notification of Transmittal of International Search Report and the Written Opinion (Form PCT/ISA/220), International Search Report (Form PCT/ISA/210), and Written Opinion (Form PCT/ISA/237) of the International Searching Authority for International Patent Application No. PCT/GB2015/051640 dated Sep. 4, 2015, 10 pages.

Davies, Mike, et al., "High-density gamma radiation spectrometry surveys of contaminated land", Proceedings of the 14th International Conference on Environmental Remediation and Radioactive Waste Management, ICEM11, Sep. 25-29, 2011, Reims, France; published by American Society of Mechanical Engineers (ASME).

Gardner, W.R., et al., "Real-Time Compression of Logging Data", Proceedings of the European Petroleum Conference, Nov. 16, 1992, pp. 557-566, XP008048334.

* cited by examiner

SPECTRAL DATA COMPRESSION

This application is a 35 U.S.C. § 371 national phase filing of International Application No. PCT/GB2015/051640 filed on Jun. 5, 2015, and further claims priority to United Kingdom Patent Application No. 1410028.3 filed on Jun. 5, 2014, with the contents of the foregoing applications hereby being incorporated by reference herein in their respective entireties.

This invention relates to methods and systems for compressing data, e.g. arranged in the form of a histogram. It relates in particular to compressing data in histograms used for gamma radiation spectroscopy.

The survey of contaminated land for radioactive material is a frequent task in remediation scenarios, notably nuclear facilities. In particular, the presence of radioactive material can result in complications with the decommissioning of a site and the disposal of the resulting waste. Providing accurate and detailed gamma radiation surveys of contaminated land is therefore a beneficial step in identifying areas of contamination to allow the radioactive material to be treated or disposed of correctly.

Monitors for detecting such gamma radiation, e.g. Sodium Iodide (NaI) detectors, are generally established technology and enable the concentration of a particular contaminant to be determined at a particular location, e.g. the Groundhog® range of radiation monitoring tools use spatial position data for surveying. In order to be able to fully survey an area of land, ideally spectra of the gamma radiation at each measurement location, e.g. for every square metre of land and thus taken at an approximate rate of one spectrum per second, need to be recorded.

As will be appreciated, over the course of a working day, a survey could easily collect greater than 20,000 spectra, with each spectrum potentially requiring 32 kbytes of data of storage space, for example (typically a spectrum will have 1024 to 8192 channels, each using up to 32 bits). This results in gigabytes of data being produced each day. Storing such large amounts of data not only requires a large amount of data storage (though this is now not particularly expensive) but it incurs a large cost (mainly time) for transferring the data and subsequently managing it, e.g. each time you wish to analyse it. Furthermore, if it is desired to transfer the data in real time from the radiation monitor collecting the data, this may not be possible owing to the bandwidth for data transfer between the radiation monitor and the storage to which the data is being transferred.

These factors therefore make it impractical, if not impossible, to collect data in the manner desired and so in conventional systems the contaminated land is surveyed and areas where large count rates are detected are identified. Further spectra are then taken at these locations but no data is recorded for the areas in which a low count rate is detected.

Numerous compression techniques are available, such as the standard computing ZIP and GZIP. There also exist spectrum specific compression methods such as used in the ANSI N42.42 standard, which is based on run length encoding. However the compression factor provided by these known methods still results in impractically large volumes of data.

The aim of the present invention is to provide a compression method which will give a significant reduction in data volumes.

When viewed from a first aspect the invention provides a method of compressing gamma spectroscopy data comprising:

receiving as an input data representing counts for each of a plurality of bins, the counts representing a set of binned gamma spectroscopy data;
reading the counts in each bin;
calculating a measure representative of the counts using the counts in one or more of the bins;
choosing, using the measure, which one of at least two compression schemes to use to compress the data representing the counts;
compressing the data representing the counts according to the chosen compression scheme; and
writing the compressed data representing the counts to a data storage device.

When viewed from a second aspect the invention provides a data processing system for compressing gamma spectroscopy data comprising:

a data input for receiving data representing counts for each of a plurality of bins, the counts representing a set of binned gamma spectroscopy data;
a processor arranged to:
read the counts in each bin;
calculate a measure representative of the counts using the counts in one or more of the bins;
choose, using the measure, which one of at least two compression schemes to use to compress the data representing the counts; and
compress the data representing the counts according to the chosen compression scheme; and
write the compressed data representing the counts to a data storage device.

The present invention relates to a method and data processing system for optimising the compression of gamma spectroscopy data, in which the data that has been produced or collected and is organised in a plurality of bins, each bin having an interval of a variable, and each bin containing a count of the number of observations of the variable within the interval of the bin. Such data is typically displayed graphically in a histogram, with the x-axis representing the variable and the y-axis representing the number of counts in each bin.

The data representing the counts is input into the system where the counts in each bin are then read by a processor. A representative measure of the counts is then calculated by the processor using the counts in one or more of the bins, and this measure used to determine which would be the most appropriate compression scheme to use to compress the data representing the counts, e.g. which scheme will result in least data storage space being needed to store the compressed data.

The data representing the counts is then compressed according to the chosen compression scheme and then this compressed data is written to a data storage device, e.g. to allow further processing of the data. This therefore helps to optimise the compression of the gamma spectroscopy data, and thus makes most efficient use of the storage space on the data storage device.

The data storage device may be provided in any suitable and desired way. In one embodiment the data processing system comprises the data storage device, e.g. a memory, to which the compressed outputted data is written. Alternatively the compressed data is written out to a remote data storage device, e.g. via a wired or wireless communication path, and thus the data processing system may comprise a transmitter (e.g. via a Bluetooth, wireless or mobile telephone network) for transmitting the compressed data from the data processing system to the data storage device. In both of these embodiments the data can be analysed or processed subsequently on the data processing system of the present invention or transferred to a further data processing system separate from that of the invention where they can be analysed or processed.

The compression method of the present invention therefore provides a choice of compression schemes so that the most appropriate compression scheme can be used for a particular set of binned gamma spectroscopy data, e.g. that which will output the compressed data representing the counts from the binned data in a format that takes up the least storage space. For example, if a set of binned gamma spectroscopy data is dominated by low counts then one compression scheme may result in a greater compression factor, whereas if the set of binned data includes lots of bins containing high counts then a different compression scheme may be more suitable.

In known methods of compressing data, because only a single compression scheme is available, this has to accommodate the whole range of different bin counts and thus the data storage space occupied by low count rates is far greater than is necessary, making it impractical even to store such data, e.g. 32 bits for each bin is not an efficient storage element to encode counts in a data set in which the bin counts are all less than 10. In the present invention, different compression schemes can be used for the low count data sets and the high count data sets, for example, so that larger compression factors for the data storage can be obtained, particularly for the low count data sets which can then be stored, whereas previously they would have been discarded and lost. This enables gamma spectroscopy data, particularly when taken from surveys that produce multiple sets of binned data, often containing many sets that include low counts, to be stored in an effective way, i.e. occupying a relatively small data storage space compared to what would otherwise be necessary.

Even though low count data sets do not contain much useful information individually, when they are aggregated the information that can be deduced can be very useful, e.g. it can be statistically significant. It is therefore a great benefit of the invention to be able to facilitate the storage of all the data sets. For example if the data is being collected across an area, e.g. of land, the low count data sets can be aggregated over space and/or time to produce a meaningful analysis of the collected data. Furthermore, Geographic Information Systems (GIS) analysis, for example, can be performed to extract trends or maps from the collected data. The currently used methods for treating such data sets do not allow this as if the count rate is low, the data set is discarded, with only the data sets containing high counts being kept for further analysis.

By compressing the data representing the counts such that it can be stored in a manageable size, the cost of managing the data can be reduced, particularly the time taken for transferring and subsequently managing and analysing the data. Thus particularly if the data is compressed and written out as it collected, i.e. in real time, the bandwidth for transferring the data is an acceptable level and will not limit the ability to collect and store all the data at a continuous rate, as is the case for conventional systems.

Each set of binned gamma spectroscopy data could represent the frequencies of any suitable observable variable, i.e. which can be displayed in the form of a histogram. However in one set of embodiments preferably each set of binned data comprises a gamma energy spectrum, i.e. a plurality of energy measurements, for example a gamma radiation spectrum produced from the decay of radioactive material where the energy measurements correspond to the photon energies emitted from the radioactive material. Energy spectra are well suited to being, and often are, stored using a binning system, with the interval of each bin corresponding to a particular energy range. The counts in each bin represent each instance that an energy measurement from the observed source falls within the energy range of the bin, e.g. for gamma radiation source which is being measured, a suitable device will detect emitted photons and for each photon detected a count will be added to the bin into which its energy falls. The bins could be different widths but preferably the bins are all the same width, as this reduces the data needed to be written out, i.e. it is simply necessary to write out the bin width once, either for each set of binned data, or the data processing system could know that the bin width is fixed at a particular value for all of the sets of binned data input.

Therefore preferably the method and data processing system of the present invention are used in or with a device that it used to measure gamma radiation spectra, e.g. in contaminated land. One example of such a monitoring device is a Sodium Iodide (NaI) detector. Such a device is used in the Groundhog® range of radiation monitoring tools which, in addition to the gamma radiation detection, use spatial position data for outdoor surveying, followed by GIS analysis. Thus in one embodiment preferably the set of binned data is associated with spatial position data, e.g. using global navigation satellite systems (GNSS) or an optical positioning system, and/or GIS data, e.g. when the compressed data is outputted, i.e. the spatial position and/or GIS data can be written out to memory with the compressed data. Preferably each set of binned data is associated with a single location.

The monitoring device, i.e. the detector collecting the gamma radiation spectra, could output the measured data to a separate data processing system, e.g. a computer by a wired or wireless connection, which receives the data, compresses it and then outputs it to a storage area, but preferably the monitoring device comprises the data processing system of the present invention. This overcomes the problem of having a limited bandwidth for data transfer from the monitoring device because the compression is performed shortly after the data is measured (a buffer may be used) and so the compressed data is transferred from the monitoring device. As will be discussed below, the preferred compression schemes are simple and therefore fast techniques which allow the data to be compressed in real time, e.g. at a rate such that spectra can be measured at a rate of approximately one Hertz per detector.

This allows far more spectra to be collected and stored and so, for example, the monitoring device can be transported, e.g. by walking round or driving on a vehicle, across contaminated land, to collect and store spectra continuously, thus enabling a much more thorough survey to be performed than was possible previously. Thus at least preferred embodiments of the invention the data, particularly when aggregated over space and/or time, are more powerful and give a more complete picture of the contaminated land.

Therefore the invention also extends to a monitoring device comprising: a gamma radiation detector arranged to collect a set of binned gamma spectroscopy data, the binned gamma spectroscopy data being represented by counts for each of a plurality of bins, and a data processing system as described herein for compressing the data representing the counts.

The invention also extends to a method of collecting and compressing gamma spectroscopy data comprising: using a monitoring device to collect a set of binned gamma spectroscopy data, the binned gamma spectroscopy data being represented by counts for each of a plurality of bins, and compressing data representing the counts according to the method as described herein.

Furthermore, the invention extends to a computer readable storage medium storing computer software code which when executing on a processor performs the methods described herein. The data processing system could be any suitable system, such as a computer and/or a micro-processor based system. The data processing system may also comprise, and in an embodiment does also comprise, and/or is in communication with, one or more memories and/or memory devices that store the data described herein, and/or that store software for performing the methods described herein.

The compressed data is preferably tagged, e.g. for each set of binned data stored, with which compression scheme is used. Therefore preferably the method comprises the step of writing a tag, associated with the compressed data, to the data storage device, to indicate the chosen compression scheme. Preferably the tag comprises a byte of data in which a value corresponding to the compression scheme used is stored, e.g. each different compression scheme has a unique value for the tag, which is written out at the beginning or end of the compressed data, e.g. when it is output. The tag can then be read, when uncompressing the data, to determine which compression scheme was used to compress the data, and therefore how the data should be read and unpacked.

The compression schemes to be used in the method of the present invention could be chosen from any suitable and desired compression schemes. In one set of embodiments one or more of the at least two different compression schemes is a lossless compression schemes (in contrast to lossy compression schemes in which some of the raw data is lost during compression). Preferably each of the at least two different compression schemes is a lossless compression schemes. This allows all of the data values to be kept so that no information is lost.

In one set of embodiments the at least two different compression schemes comprise at least two of a "low data rate" compression scheme, a "nibble" compression scheme and a "byte" compression scheme, though further compression schemes could be used, e.g. a "two bytes" compression scheme, and higher multiples of a nibble or a byte. Preferably three different compression schemes are compared, e.g. low data rate, nibble and byte, and thus the method comprises the step of choosing, using the measure, which one of at least two compression schemes to use to compress data representing the counts.

The different compression schemes to be used for the comparison could be chosen when building or configuring the system, i.e. before the data is collected and read into the data processing system. Alternatively the different compression schemes to be compared could be chosen dependent on the data representing the counts input into the data processing system, for example some of the compression schemes are more suitable for low count rates in the bins, e.g. the low data rate compression scheme, whereas other compression schemes are more suitable for high count rates in the bins, e.g. the byte compression scheme. In the latter embodiment, the method comprises the step of choosing at least two different compression schemes based on the counts in each bin, after the counts have been read in by the data processing system. However, even if compression schemes to be used are predetermined, an intelligent choice of which compression schemes to be used could be made depending on the expected count rate of the set(s) of binned data to be compressed, e.g. before the data is collected. As will be appreciated, because the binned data is a gamma radiation spectrum, the number of counts in each bin will depend, inter alia, on the duration over which each sample is taken, and the rate of decay of the radioactive sample being detected.

The "low data rate" compression scheme is suitable for very low data rates, e.g. less than 50 counts in total for the set of binned data (50 counts per spectrum), and particularly suitable for spectra in which many of the bins contain no or only one or two counts. This compression scheme comprises storing the bin numbers in which counts are present. I.e. for bins in which the count is zero, no information is written out in this compression scheme. If there are multiple counts in a single bin, the bin number is stored for each count in the bin, i.e. if there are three counts in bin number five, "5, 5, 5" is written out. The bin numbers can be written out in any suitable or desired format but preferably each bin number is written out as a two byte word (two bytes enables the total number of bins to be up to 65536).

Preferably the bins are numbered consecutively along the x-axis of the binned data set, e.g. from 0 upwards, i.e. 0, 1, 2, 3, etc. As indicated above, a spectrum typically consists of at least 1024 bins but may be another power of 2, e.g. 256, 512, 2048, 4096, 8192, etc.

The "nibble" compression scheme represents the bin counts in a "nibble" of data, i.e. 4 bits, and is therefore optimal for data rates giving counts of up to about 15 counts per bin, i.e. medium count rates. In a preferred embodiment it is suitable for encoding counts up to 13 counts per bin, owing to values 14 and 15 being used as codes for particular features of the set of binned data, though as will be described below, preferred embodiments of the nibble compression scheme can handle counts of above 13 counts in a bin. However, if many of the bins have a count of greater than 13 then the "byte" compression scheme may be more suitable.

This compression scheme comprises representing the count in each bin in a nibble of data. The bin number could also be written out along with each piece of compressed data representing a count, or packed elsewhere into the stored data, but preferably the compressed data representing the counts in each bin is written out in a known sequence, e.g. from the first bin to the last bin in order along the x-axis of the binned data set, so it is unnecessary to write out each bin number with the compression scheme.

In one embodiment of the nibble compression scheme, if the count in a bin is between 0 and 13, the count in the bin is represented in a nibble. If the count in the bin is greater than or equal to 14, the value 15, for example, is represented in a nibble, followed by the actual value in the bin, stored in two bytes. If more than three consecutive bins have zero counts then run length encoding can be used, by representing the multiple zeros using the value 14, for example, in a nibble followed by the value of the number of consecutive bins, less two, containing zero counts, represented in a nibble (if there are two consecutive zeros then there is no advantage in storing the code 14, the two zeros can simply be written out). For example, if there are zeros in ten consecutive bins then the value 14 is represented in a nibble followed by the value 8 represented in another nibble. If there are greater than 17 consecutive zeros the next lot of consecutive zeros are represented in the same manner.

The "byte" compression scheme represents the bin counts in a "byte" of data, i.e. 8 bits, and is therefore suitable for data rates giving counts of up to about 255 counts per bin, i.e. high count rates. In a preferred embodiment it is suitable for encoding counts up to 253 counts per bin, owing to values 254 and 255 being used as codes for particular features of the set of binned data, though as will be described below, preferred embodiments of the byte compression scheme can handle counts of above 253 counts in a bin.

This compression scheme comprises representing the count in each bin in a byte of data. The bin number could also be written out along with each count but preferably the counts in each bin are written out in a known sequence, e.g. from the first bin to the last bin in order along the x-axis of the binned data set, so it is unnecessary to write out each bin number with the compression scheme.

In one embodiment of the byte compression scheme, if the count in a bin is between 0 and 253, the count in the bin is represented in a byte. If the count in the bin is greater than or equal to 254, the value 255, for example, is represented in a byte, followed by the actual value in the bin, represented in two bytes. If more than three consecutive bins have zero counts then run length encoding can be used, by representing the multiple zeros using the value 254, for example, in a byte followed by the value of the number of consecutive bins, less two, containing zero counts, represented in a byte. For example, if there are zeros in ten consecutive bins then the value 254 is stored in a byte followed by the value 8 represented in another byte. If there are greater than 257 consecutive zeros the next lot of consecutive zeros are represented in the same manner.

As will be appreciated, each of the low data rate, nibble and byte compression schemes are lossless compression schemes, and therefore no data is lost from the raw data during compression, but these schemes allow the data representing the counts to be stored in a much smaller volume than would otherwise be used for the raw data. The Applicant has found that typically these compression schemes can reduce the data stored for a measured gamma radiation spectrum from up to 32 kbytes per spectrum to between 100 and 200 bytes per spectrum, i.e. a large increase in the compression factor compared to existing techniques. Thus this allows all of the data representing the counts, even for spectra containing very low count rates to be kept, once it has been compressed.

These lossless compression techniques are very simple, e.g. compared to zip compression, because the schemes described just read in the counts of the binned data set and make a decision based thereon. Therefore the compression of the data representing the counts, in accordance with at least preferred embodiments of the present invention, takes only a few milliseconds. This makes such embodiments suitable for collecting and compressing data in real time, even for data which is collected at a relatively high rate, e.g. at a frequency of one Hertz.

It will be appreciated that other compression schemes, using other, e.g. higher, multiples of nibbles and/or bytes could also be used in a similar manner to the nibble and byte compression schemes outlined above, e.g. two bytes, four bytes, etc., if these are more suited to the count rates of the collected binned gamma spectroscopy data sets. The count rates may depend on the time over which the sample is taken, the concentration of the gamma radiation source, and/or the rate of decay of the gamma radiation source.

The set of binned data could be split up into sub-sets, with the methods described herein being performed on each sub-set individually, i.e. such that a different compression scheme could be used for different sub-sets of the binned data. This may be appropriate for certain data sets if, for example, there are large variations in the bin counts across the data set, such that different sub-sets of the binned data will benefit from different compression schemes thus giving increased compression of the data. However preferably the whole of the set of binned data is treated as one such that the same compression technique is used for the whole of the set of binned data.

The step of calculating the measure that is representative of the counts could comprise calculating a characteristic value, or set of values, from the input data representing the counts. For example, this could be one or more of the total number of counts in the set of binned data, the maximum number of counts in a bin, the total number of zero counts, the mean number of counts, the median number of counts, or the number of bins with counts that exceed a particular value or values. For example, if the low data rate compression scheme, the nibble compression scheme and the byte compression scheme are to be compared, the number of bins containing between 0 and 3 counts, between 4 and 15 counts, and between 16 and 255 counts could be determined. The range of counts with the largest number of bins could then be used to choose which compression scheme to use.

However in a preferred embodiment the step of calculating the measure that is representative of the counts comprises calculating a measure representative of the amount of storage space required to store the compressed data for each of the compression schemes being compared. For example, this could comprise compressing the data for each of the compression schemes and calculating the compression factor achieved. The measure for each of the compression schemes can then be compared to choose which compression scheme to use, i.e. the measure which indicates the least amount of storage space required. As, at least in preferred embodiments, the compression schemes are quick to perform, it is simpler (and more reliable) to simply compress the data according to each compression scheme, than to calculate one or more characteristics for each set of binned data. This has the further advantage that once the compression scheme to be used has been chosen, the already compressed data simply can be written out.

Therefore in a preferred embodiment the method comprises the steps of compressing the data representing the counts according to each of the at least two compression schemes, calculating, as the measure, the storage space required to store the compressed data representing the counts for each of the at least two compression schemes, choosing, using the measure, the compression scheme which requires the least storage space, and writing the compressed data representing the counts for the chosen compression scheme to the data storage device. This is considered novel and inventive in its own right and thus from a further aspect the invention provides a method of compressing gamma spectroscopy data comprising:

receiving as an input data representing counts for each of a plurality of bins, the counts representing a set of binned gamma spectroscopy data;

reading the counts in each bin;

compressing the data representing the counts according to each of at least two compression schemes;

comparing the storage space required to store the compressed data representing the counts for each of the at least two compression schemes;

choosing the compression scheme which requires the least storage space; and writing the compressed data representing the counts for the chosen compression scheme to a data storage device.

The invention also provides a data processing system for compressing gamma spectroscopy data comprising:

a data input for receiving data representing counts for each of a plurality of bins, the counts representing a set of binned gamma spectroscopy data;

a processor arranged to:
read the counts in each bin;
compress the data representing the counts according to each of at least two compression schemes;
compare the storage space required to store the compressed data representing the counts for each of the at least two compression schemes; and
choose the compression scheme which requires the least storage space; and
write the compressed data representing the counts for the chosen compression scheme to a data storage device.

An embodiment of the invention will now be described, by way of example only, with reference to the accompanying drawings, in which.

Figure 1:
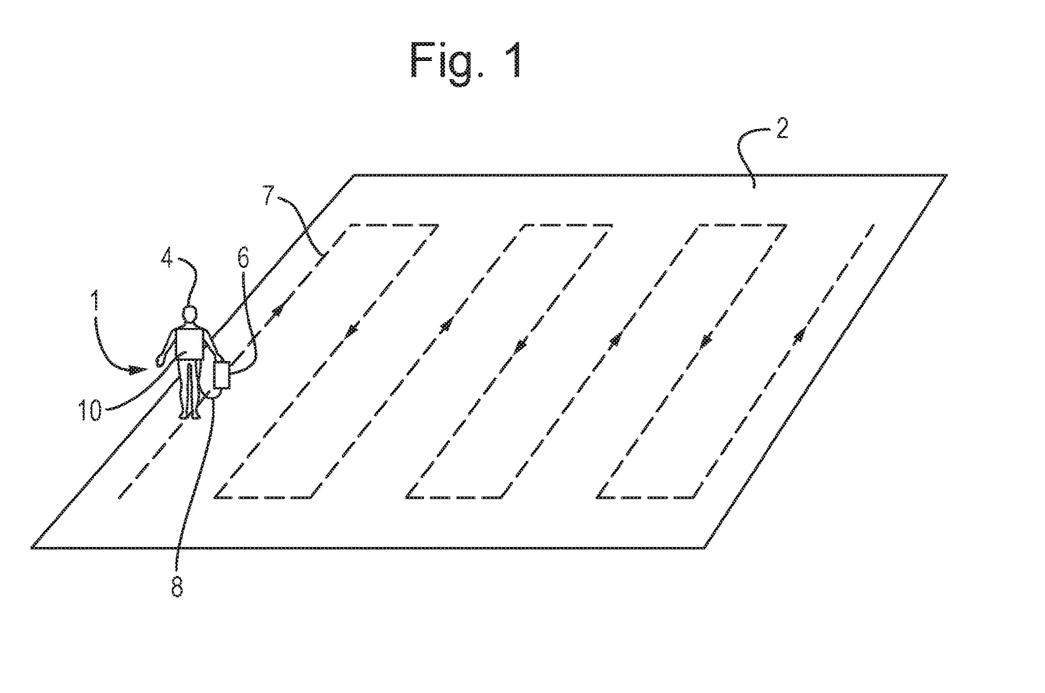
FIG. 1 shows an overview of the use of a monitoring device including a data processing system in accordance with an embodiment of the invention.

FIG. 1 shows an overview of the use of a monitoring device 1 including a data processing system (a computer) according to an embodiment of the present invention. In this embodiment an area of contaminated land 2, e.g. a field, is to be surveyed for the presence of a gamma radiation source. To survey the contaminated land 2, an operator 4 carries the monitoring device 1 which includes a gamma radiation detector 6, e.g. a Sodium Iodide (NaI) detector as used in the Groundhog® range of radiation monitoring tools, along a path 7 across the contaminated land 2. The gamma radiation detector 6 is connected via a data connection cable 8 to a computer 10, used to compress and store the captured data representing the gamma radiation spectra, which is also carried by the operator 4.

Figure 2:
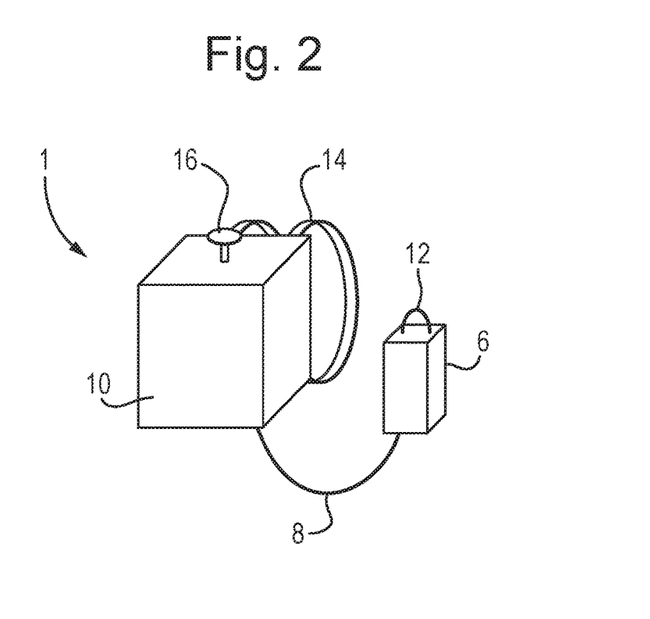
FIG. 2 shows a schematic view of one embodiment of a monitoring device including a data processing system in accordance with an embodiment of the invention.

The monitoring device 1 is shown in more detail in FIG. 2 where it can be seen that the gamma radiation detector 6 is handheld via a carry handle 12 and the computer 10 is carried via shoulder straps 14. The monitoring device 1 also includes a GNSS receiver 16, connected to the computer 10, to determine the position of the monitoring device 1 when each gamma radiation spectrum is collected. The gamma radiation detector 6 is connected via a data connection cable 8 to the computer 10 to allow it to transfer the gamma radiation spectra collected to the computer 10.

Figure 3:
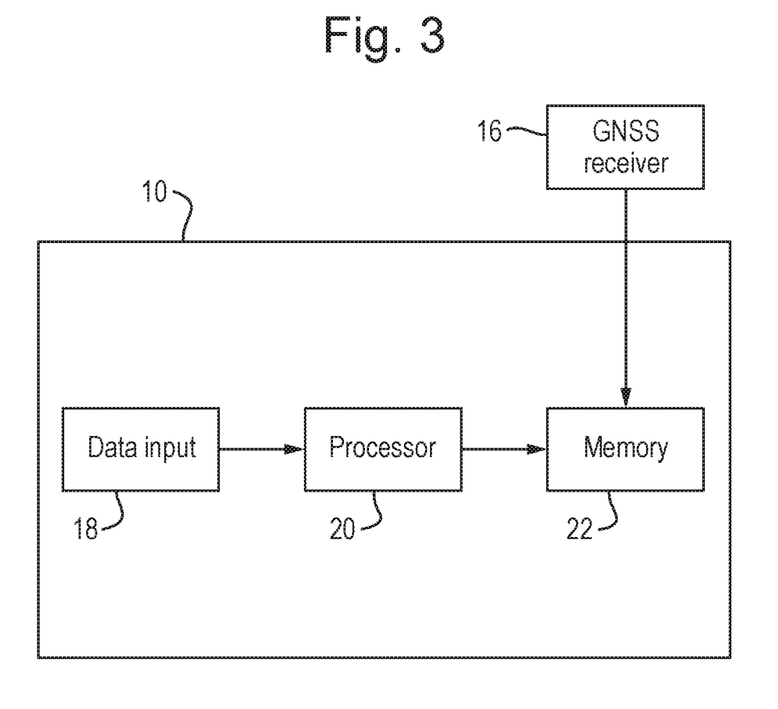
FIG. 3 block diagram of the main components of the data processing system.

The main working components of the computer 10 are shown in FIG. 3. The computer 10 includes a data input 18 arranged to receive data representing the gamma radiation spectrum collected by the gamma radiation detector 6 via the data connection cable 8. The data input 18 feeds the received data to a processor 20, e.g. a general purpose central processing unit (CPU) which runs software commands to compress the data. The compressed data, along with the associated GNSS data determined by the GNSS receiver 16 (external to the computer 10), are written out to a memory 22.

Figure 4A:
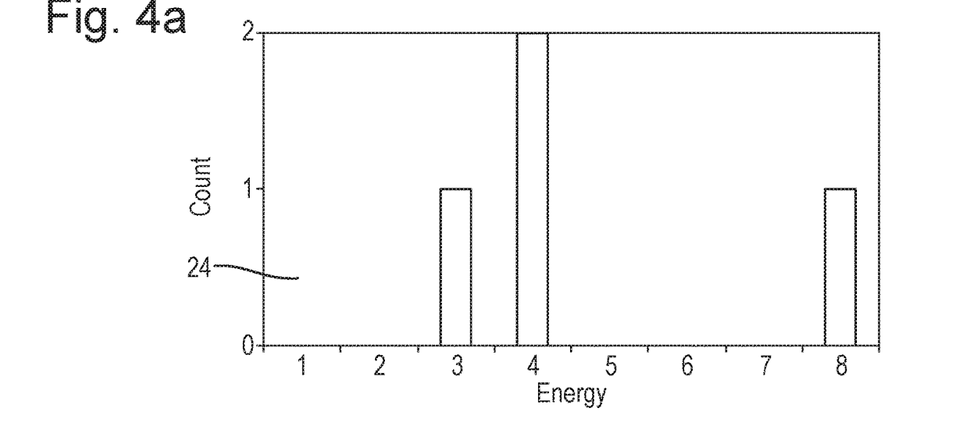
FIGS. 4a, 4b and 4c show histograms containing binned data with low, medium and high count rates respectively for use with an embodiment of the invention.
Figure 4B:
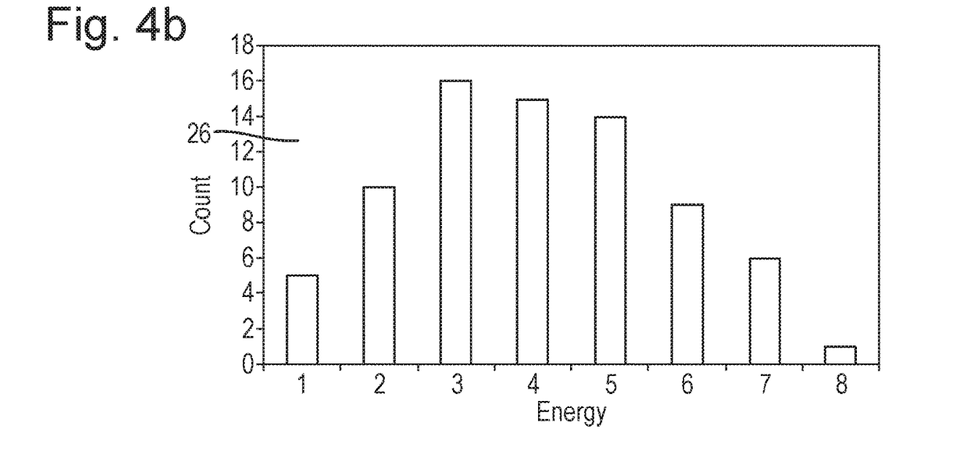
Figure 4C:
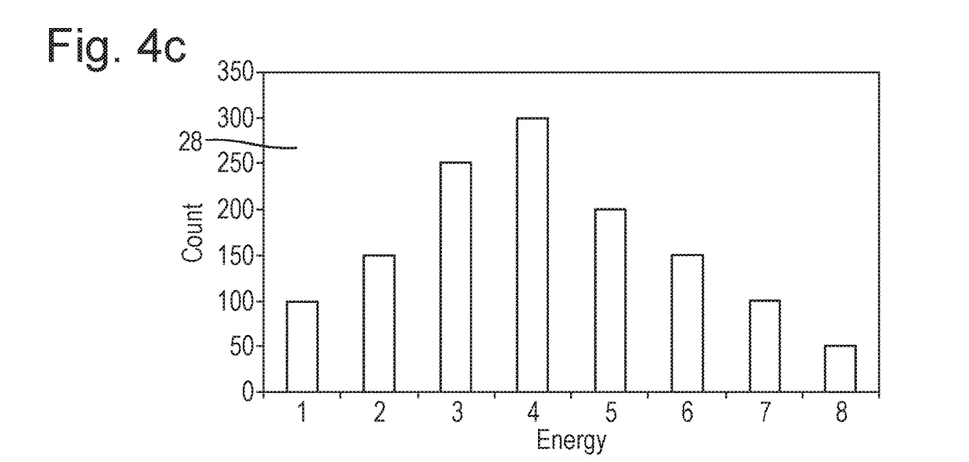
Figure 6:
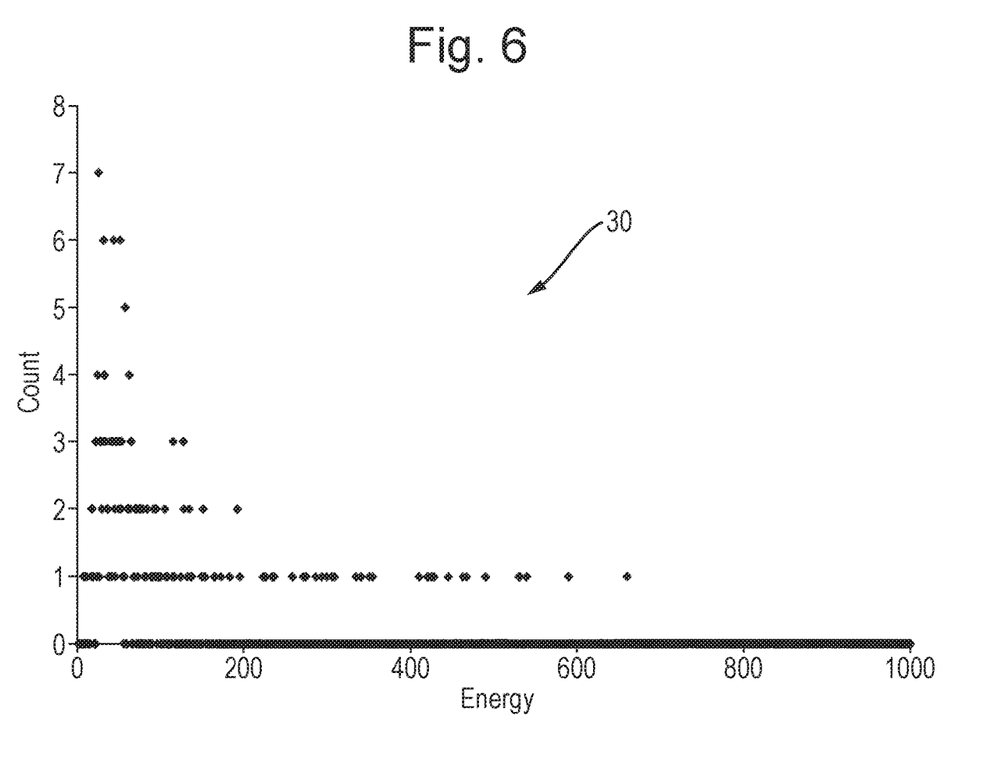
FIG. 6 shows a histogram containing a full spectrum of gamma radiation data for use with an embodiment of the invention.

FIGS. 4a, 4b and 4c show histograms 24, 26, 28 containing data representing illustrative gamma radiation spectra collected by the gamma radiation detector 6 which are subsequently sent to the computer 10 to be compressed and stored in the memory 22. For the purposes of clarity each histogram only contains eight bins, whereas typically a gamma radiation spectra will consist of 1024 bins, as shown in FIG. 6.

The histogram in FIG. 4a has values of 0, 0, 1, 2, 0, 0, 0 and 1 in the eight bins respectively. The histogram in FIG. 4b has values of 5, 10, 16, 15, 14, 9, 6 and 1 in its eight bins respectively. The histogram in FIG. 4c has values of 100, 150, 250, 300, 200, 150, 100 and 50 in its eight bins respectively. For each of the histograms, each bin represents a different energy range for the gamma radiation detected.

Operation of the system will now be described with reference to the Figures, including the flow chart of FIG. 5 which details the main steps of a method in accordance with an embodiment of the invention.

To collect the gamma radiation spectra an operator 4, carries the monitoring device 1 along a path 7 across an area of contaminated land 2. The operator carries the gamma radiation detector 6 in their hand so that it is close to the ground to measure the gamma radiation being emitted from the contaminated land 2. Over regular time periods, e.g. every second, the gamma radiation detector 6 measures the gamma radiation (step 101, FIG. 5) which thus gives an indication of the concentration of the radioactive material in the contaminated land 2.

The gamma radiation detector 6 measures the energy of the emitted gamma radiation, and has a number of channels, e.g. 1024, in which it collects this data, i.e. each channel corresponds to an energy range for the emitted gamma radiation.

Each collected spectrum is therefore represented by a set of binned data, with each bin containing a number of counts that is equal to the number of gamma radiation photons having an energy within the channel of the gamma radiation detector 6 that corresponds to the bin in the spectrum. Data representing counts (in each of the bins) for each set of binned data is output from the gamma radiation detector 6 via the data connection cable 8 where it is received at the data input 18 of the computer 10 (step 102, FIG. 5).

At the same time as the gamma radiation spectra are being collected, the GNSS receiver 16 on the computer 10 determines the position of the monitoring device 1 (step 103, FIG. 5), and therefore the position at which each gamma radiation spectrum was collected.

Typical gamma radiation spectra are shown in FIGS. 4a, 4b and 4c represented as sets of binned data. FIG. 4a shows a gamma radiation spectrum with a low number of counts. FIG. 4b shows a gamma radiation spectrum with a medium number of counts. FIG. 4c shows a gamma radiation spectrum with a high number of counts.

Figure 5:
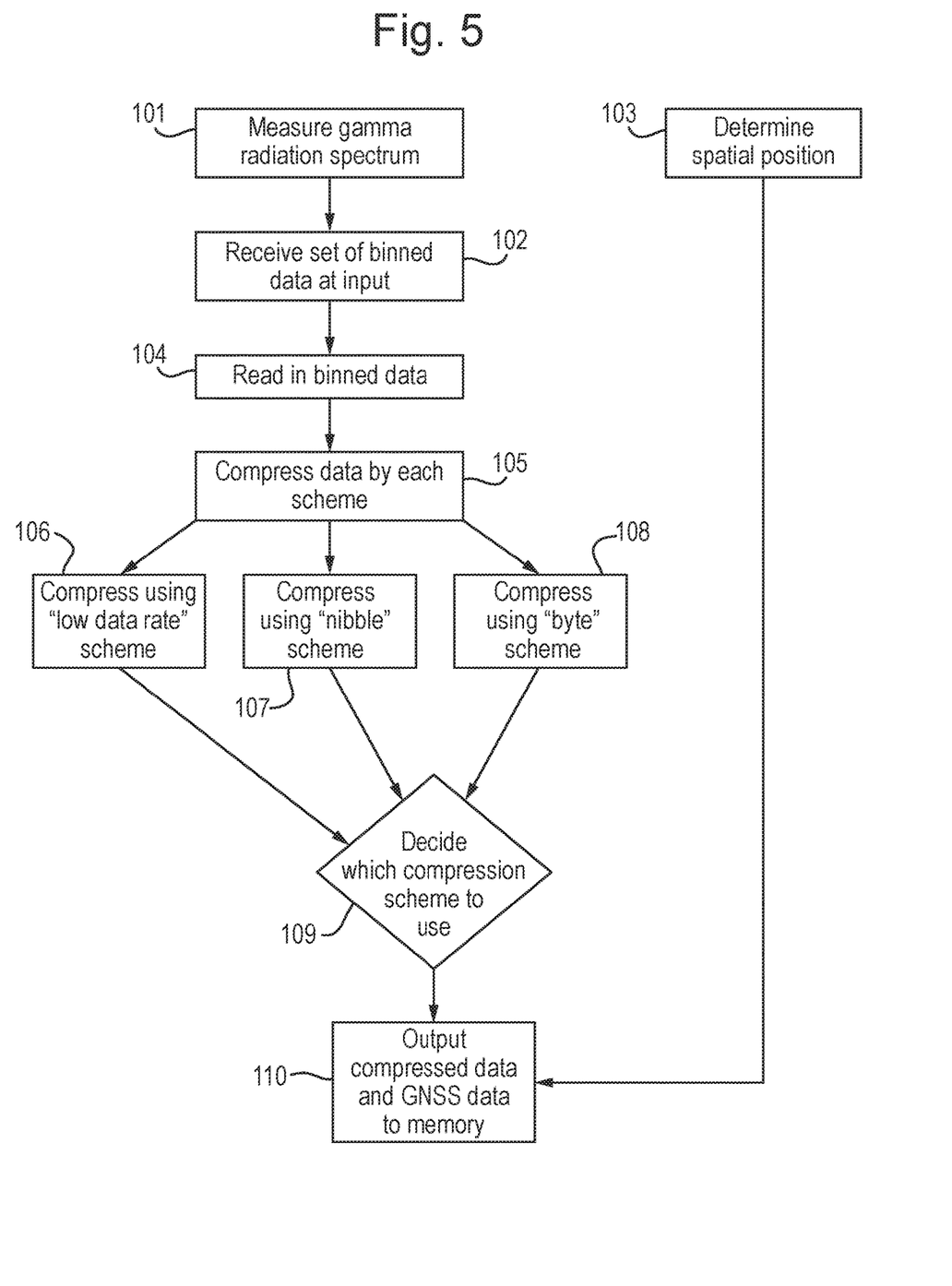
FIG. 5 shows a flow diagram showing the steps of performing a method according to an embodiment of the present invention.

For each set of binned data collected, data representing counts is received by the data input 18 which is then handled by the computer's processor 20, where first the counts in each bin are read (step 104, FIG. 5). The processor 20 then compresses the data representing the counts for each set of binned data using each of three compression schemes (step 105, FIG. 5). Thus data representing the counts is compressed by each of a "low data rate" compression scheme (step 106, FIG. 5), a "nibble" compression scheme (step 107, FIG. 5) and a "byte" compression scheme (step 108, FIG. 5).

Once the data representing the counts has been compressed by each scheme, the storage space needed to store the compressed data, e.g. the size of the data file containing the compressed data, is used as a measure representative of the counts which is compared for each of the compression schemes (step 109, FIG. 5) and the compression scheme which results in the least storage space is chosen. The compressed data representing the counts according to the chosen compression scheme can then be output (step 110, FIG. 5) to the computer's memory 22 to be stored, along with the GNSS data corresponding to the set of binned data.

Taking the examples shown in FIGS. 4a, 4b and 4c in turn, there are very few counts in the histogram 24 in FIG. 4a is 0, so the "low data rate" compression scheme (step 106) is chosen for this set of data. This compression scheme involves writing out the bin numbers in which counts are present, with the bin numbers being written out a number of times equal to the counts in each particular bin. Therefore for the data representing the counts shown in the histogram 24 of FIG. 4a data representing the values 3, 4, 4, 8 are written out, along with a tag indicating that the data has been compressed using the "low data rate" compression scheme.

In FIG. 4b the histogram 26 has a medium number of counts, so the "nibble" compression scheme (step 107, FIG. 5) is chosen to be used. This compression scheme involves writing out the value of the counts in each bin in a "nibble" of data, i.e. 4 bits. If the count in a bin is between 0 and 13, the count in the bin is represented in a nibble. If a plurality of consecutive bins have zero counts then run length encoding is used, by representing the multiple zeros with the value 14 in a nibble followed by the value of the number of consecutive bins, less two, containing zero counts, represented in a nibble. If the count in the bin is greater than or equal to 14, the value 15 is represented in a nibble, followed by the actual value in the bin, represented in two bytes.

Therefore for the data representing the counts shown in the histogram 26 of FIG. 4b data representing the values 5, 10, 15, 15, 15, 9, 6, 1 are written out, each in a nibble, with values of 16, 15 and 14 written out, each in two bytes, following the values of 15 respectively, along with a tag indicating that the data has been compressed using the "nibble" compression scheme.

There are a large number of counts in the histogram 28 in FIG. 4c is 150, so the "byte" compression scheme (step 108, FIG. 5) is chosen to be used. This compression scheme involves writing out the value of the counts in each bin in a "byte" of data, i.e. 8 bits. If the count in a bin is between 0 and 253, the count in the bin is represented in a byte. If a plurality of consecutive bins have zero counts then run length encoding is used, by representing the multiple zeros using the value 254 in a nibble followed by the value of the number of consecutive bins, less two, containing zero counts, represented in a byte. If the count in the bin is greater than or equal to 254, the value 255 is represented in a byte, followed by the actual value in the bin, represented in two bytes.

Therefore for the data representing the counts shown in the histogram 28 of FIG. 4c data representing the values 100, 150, 250, 255, 200, 150, 100 and 50 are written out, each in a byte, with a value of 300 written out in two bytes, following the value of 255, along with a tag indicating that the data has been compressed using the "byte" compression scheme.

FIG. 6 shows an example of data representing a gamma radiation spectrum containing 1024 channels which was taken over a period of 1 second. This real-life example contrasts with the illustrative examples in FIGS. 4a, 4b and 4c, though contains a similar count density to the histogram of FIG. 4b. There are 214 counts in total which are distributed across a number of the channels, though as can be seen the majority of the channels have a zero count.

Using a conventional storage technique (i.e. with no compression), e.g. representing the count of each channel in a 4 byte word, gives a total data storage size for the spectrum of 4096 bytes, i.e. 1024 channels each using 4 bytes. Using a conventional compression technique (ANSI N42.42 run length compression) reduces the storage size for this spectrum to 527 bytes (this achieves a reasonable compression factor owing to the large number of zeros in the tail of the spectrum).

To show how an embodiment of the present invention could improve on this compression factor, the data representing the counts of the spectrum of FIG. 6 was compressed using each of the "low data rate", the "nibble" and the "byte" compression schemes described above. The "low data rate" compression scheme gives a storage size for this spectrum of 428 bytes, the "nibble" compression scheme gives a storage of 156 bytes and the "byte" compression scheme gives a storage size of 230 bytes.

Using the steps of the method as shown in FIG. 5, the "nibble" compression scheme would be chosen for writing out the data in the histogram of FIG. 6, to achieve the best compression factor and thus the smallest storage size for the data representing the counts of the spectrum, along with a tag to indicate the data has been compressed using the "nibble" compression scheme.

The storage sizes for the three different compression schemes, in accordance with at least an embodiment of the present invention, for the data representing the spectrum of FIG. 6, as detailed above, can all be seen to be significantly less than the storage size given by using a conventional storage technique, and are indeed all less than the storage size given by using a conventional compression technique (ANSI N42.42 run length compression). The "nibble" compression scheme, which affords the greatest compression factor for this particular spectrum, gives a compression factor of greater than 25 over the conventional storage technique.

It can be seen from the above that in at least preferred embodiments of the compression method a choice of compression schemes is provided so that the most appropriate compression scheme can be used for a particular set of binned data, e.g. that which will output the compressed data representing the counts in a format that takes up the least storage space. For example, if a set of binned data is dominated by low counts then the "low data rate" compression scheme may result in a greater compression factor, whereas if the set of binned data includes lots of bins containing high counts then the "byte" compression scheme may be more suitable.

This enables gamma radiation spectra data, particularly when taken from surveys that produce multiple sets of binned data, often containing many sets that include low counts, to all be stored in an effective way, i.e. occupying a relatively small data storage space compared to what would otherwise be necessary. By compressing the data such that it can be stored in a manageable size, the cost of managing the data is reduced, particularly the time taken for transferring and subsequently managing and analysing the data. Thus particularly if the data is compressed and written out as it collected, i.e. in real time, the bandwidth for transferring the data is an acceptable level and will not limit the ability to collect and store all the data at a continuous rate, as is the case for conventional systems.

The invention claimed is:

1. A method of compressing gamma spectroscopy data, the method comprising:
   receiving data comprising counts for each bin of a plurality of bins, the counts representing a set of binned gamma spectroscopy data;
   reading the counts in each bin of the plurality of bins;
   compressing the binned gamma spectroscopy data represented by the counts according to each lossless compression scheme of at least two lossless compression schemes;
   comparing storage space requirements for storing the compressed binned gamma spectroscopy data represented by the counts for each lossless compression scheme of the at least two lossless compression schemes;
   choosing the lossless compression scheme of the at least two lossless compression schemes that requires the least storage space in a dedicated data storage device; and
   writing, to the dedicated data storage device, the compressed binned gamma spectroscopy data represented by the counts for the chosen lossless compression scheme.

2. The method of claim 1, wherein the set of binned gamma spectroscopy data is associated with spatial position data.

3. The method of claim 1, further comprising writing, to the dedicated data storage device, a tag associated with the compressed binned gamma spectroscopy data to indicate the chosen lossless compression scheme.

4. The method of claim 1, wherein the at least two lossless compression schemes comprise at least two of: (a) a low data rate compression scheme that comprises storing bin numbers in which the counts are present, (b) a nibble compression scheme that comprises representing the counts in each bin in a nibble of data, or (c) a byte compression scheme that comprises representing the counts in each bin in a byte of data.

5. A method of collecting and compressing gamma spectroscopy data, the method comprising: using a monitoring device to collect a set of binned gamma spectroscopy data, the set of binned gamma spectroscopy data being represented by counts for each bin of a plurality of bins, and compressing the binned gamma spectroscopy data represented by the counts according to the method of claim 1.

6. A data processing system for compressing gamma spectroscopy data, the data processing system comprising:
   a data input for receiving data comprising counts for each bin of a plurality of bins, the counts representing a set of binned gamma spectroscopy data; and
   a processor configured to:
      read the counts in each bin of the plurality of bins;
      compress the binned gamma spectroscopy data represented by the counts according to each lossless compression scheme of at least two lossless compression schemes;
      compare storage space requirements for storing the compressed binned gamma spectroscopy data represented by the counts for each lossless compression scheme of the at least two lossless compression schemes; and
      choose the lossless compression scheme of the at least two lossless compression schemes that requires the least storage space in a dedicated data storage device; and
      write, to the dedicated data storage device, the compressed binned gamma spectroscopy data represented by the counts for the chosen lossless compression scheme.

7. The data processing system of claim 6, wherein the set of binned gamma spectroscopy data is associated with spatial position data.

8. The data processing system of claim 6, wherein the processor is configured to write, to the dedicated data storage device, a tag associated with the compressed binned gamma spectroscopy data to indicate the chosen lossless compression scheme.

9. The data processing system of claim 6, wherein the at least two lossless compression schemes comprise at least two of: (a) a low data rate compression scheme that comprises storing bin numbers in which the counts are present, (b) a nibble compression scheme that comprises representing the counts in each bin in a nibble of data, or (c) a byte compression scheme that comprises representing the counts in each bin in a byte of data.

10. A monitoring device comprising: a gamma radiation detector arranged to collect a set of binned gamma spectroscopy data, the binned gamma spectroscopy data being represented by counts for each bin of a plurality of bins, and a data processing system as claimed in claim 6 for compressing binned gamma spectroscopy data represented by the counts.

11. A computer readable storage medium storing computer software code which when executed on a processor performs a method of compressing gamma spectroscopy data comprising:
   receiving data comprising counts for each bin of a plurality of bins, the counts representing a set of binned gamma spectroscopy data;
   reading the counts in each bin of the plurality of bins;
   compressing the binned gamma spectroscopy data represented by the counts according to each lossless compression scheme of at least two lossless compression schemes;
   comparing storage space requirements for storing the compressed binned gamma spectroscopy data represented by the counts for each lossless compression scheme of the at least two lossless compression schemes;
   choosing the lossless compression scheme of the at least two lossless compressions schemes that requires the least storage space in a dedicated data storage device; and
   writing, to the dedicated data storage device, the compressed binned gamma spectroscopy data represented by the counts for the chosen lossless compression scheme.

* * * * *